O. H. ENSIGN
March 14, 1933. CARBURETOR Re. 18,767
Original Filed June 30, 1925 2 Sheets-Sheet 1
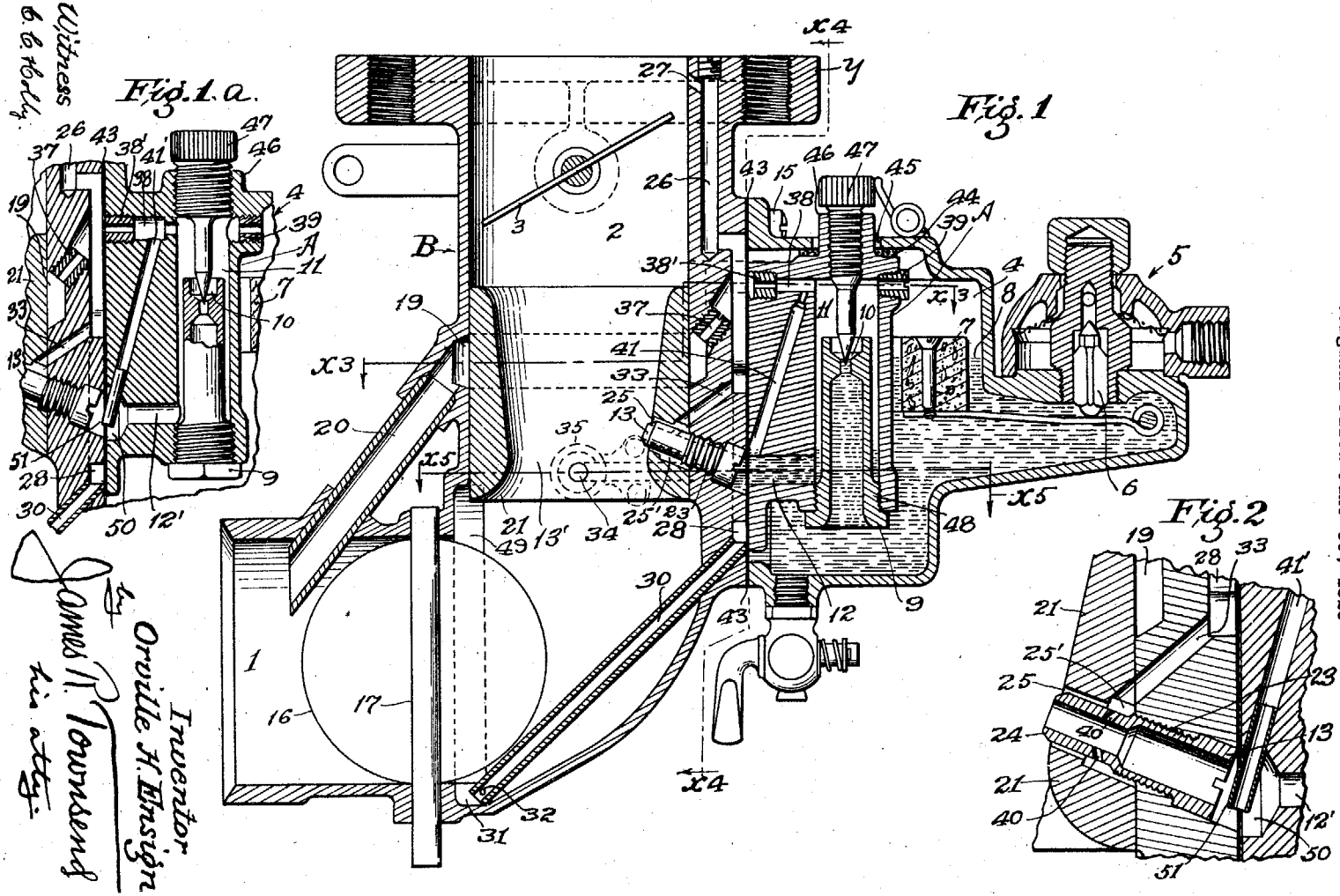
Witness
C. C. Holly.
Inventor
Orville H. Ensign
by
James R. Townsend
his atty.

O. H. ENSIGN

March 14, 1933. CARBURETOR Re. 18,767

Original Filed June 30, 1925 2 Sheets-Sheet 2

Inventor
Orville H. Ensign
by James R. Townsend
his atty.

Witness
C. C. Holly

Reissued Mar. 14, 1933

Re. 18,767

UNITED STATES PATENT OFFICE

ORVILLE H. ENSIGN, OF PASADENA, CALIFORNIA, ASSIGNOR TO ENSIGN CARBURETOR CO. LTD., OF HUNTINGTON PARK, CALIFORNIA, A CORPORATION OF CALIFORNIA

CARBURETOR

Original No. 1,792,080, dated February 10, 1931, Serial No. 40,532, filed June 30, 1925. Application for reissue filed November 21, 1932. Serial No. 643,784.

This invention relates particularly to improvements in Venturi plain tube type carburetor and more particularly to improvements on the type set forth in my copending application filed April 17, 1922, Serial No. 554,027 which matured to Patent 1,721,618 granted July 23, 1929.

An object of this invention is to construct a novel carburetor which will successfully operate, both under load and idling, at extreme angles from the normal vertical position without readjustment of the mixture.

An object is to provide a novel and simple Venturi type carburetor having only one opening to the atmosphere.

Another object is to provide novel means whereby the volume of fuel maintained in the accelerating well during idling may be increased or decreased by the changing of calibrated air bleeds.

Another object is to provide a carburetor of this type in which the air resistance in the air horn is reduced to a minimum, thus avoiding irregular proportioning characteristics which are imposed by obstructions usually found immediately below the Venturi throat.

A feature of this invention is that the idling mixture adjustment that operates on the load fuel orifice is so located with reference to the depression at the venturi that a variable adjustment of the idling mixture will not affect any load mixture.

Other objects, advantages and features of invention may appear from the accompanying drawings, the subjoined detail description and the appended claims.

The accompanying drawings illustrate the invention in a form I at present deem most preferable.

Figure 1 is an axial sectional view of a carburetor constructed in accordance with this invention with the throttle slightly open for light load and with the fuel at rest.

Fig. 1*a* is a fragmental sectional view showing a modified form of the atomizing air and fuel passages.

Fig. 2 is an enlarged fragmental sectional view of the fuel discharge nozzle as included in the form shown in Fig. 1*a*.

Figure 3:
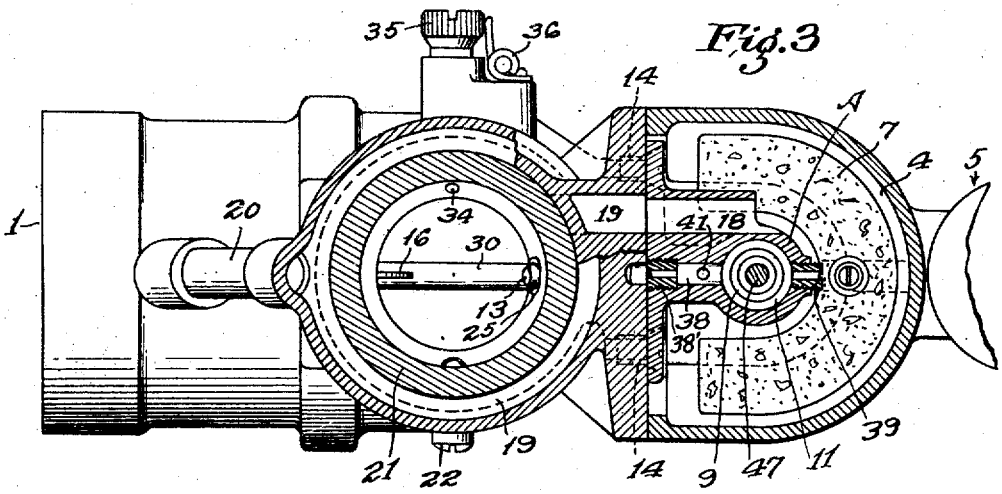
Fig. 3 is a section on irregular line *x*3—*x*3, Fig. 1.
Figure 4:
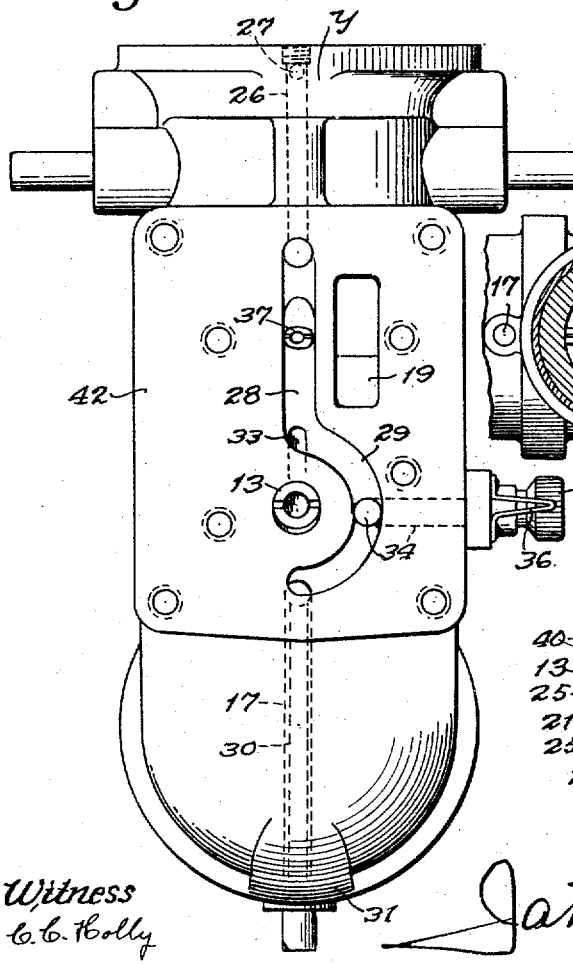
Fig. 4 is a section on line *x*4—*x*4, Fig. 1, showing the carburetor with the float bowl and the bracket containing the main fuel adjusting elements removed.
Figure 5:
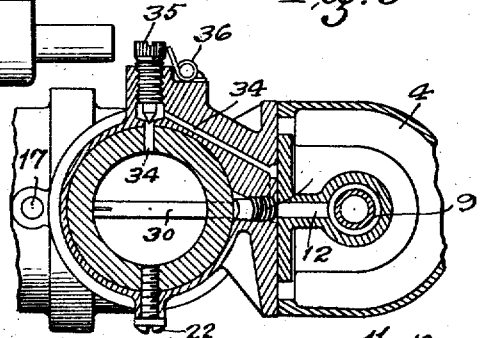
Fig. 5 is a section on reduced scale on line *x*5—*x*5, Fig. 1.

The carburetor is provided with an air intake 1, a suction passage 2 controlled by a throttle 3, a constant level fuel chamber 4 supplied with fuel through the usual fuel connections 5 controlled by the valve 6. A float 7 in the supply or fuel chamber 4 cooperates with the valve 6 to maintain the fuel in said chamber at a constant level 8.

Fuel is delivered from the constant level fuel chamber to the suction passage through a fuel passage, which comprises a fuel riser 9 opening into a suction chamber 11 through a fuel orifice 10, which may be located at any suitable height in said riser, but is preferably located near the upper end thereof. The riser 9 is spaced from the walls of the suction chamber 11 to provide ample clearance for fuel and air flow. The lower end of the suction chamber is extended in the form of a U-tube comprising a horizontal passage 12, which opens through an inclined nozzle 13 to the main air stream slightly above the smallest diameter of the Venturi throat 13′.

The major portion of the fuel passage is formed in a bracket member A, which is secured by screws 14 to the flanged face of the main body member B, which contains the air intake and suction passage. A member C that forms the constant level fuel chamber 4 is secured by screws 15 to the member B and encloses the bracket member A when in position.

The air intake may be provided with the usual choke 16 which may be operated by any usual means connected to the shaft 17.

The fuel chamber 4 is supplied with air through a balancing air passage that comprises a passage 18 formed in member A that connects to a cored passage 19 formed in the member B from which a balance tube 20 leads into the air intake, thus providing air in the float chamber coordinating with the air pressure in the air intake.

The suction passage is provided at its lower end with a member 21 which is shaped to form a Venturi throat of the usual form. A screw 22 extending through the wall of the member B secures the member 21 in the suction passage.

The nozzle 13 is provided with a threaded portion 23 that is threaded into the member B and is also provided with a contracted extension 24 that is received in and extends through a calibrated clearance bore 25 formed in and extending through one wall of the Venturi member 21, which forms the Venturi throat. The bore 25 at the inner periphery of the Venturi member forms a definite clearance around the extension 24 of the nozzle 13 and is enlarged at the outer periphery of member 21 as at 25′ to form ample clearance to permit flow of fuel therethrough as will be more fully hereinafter explained.

Figure 6:
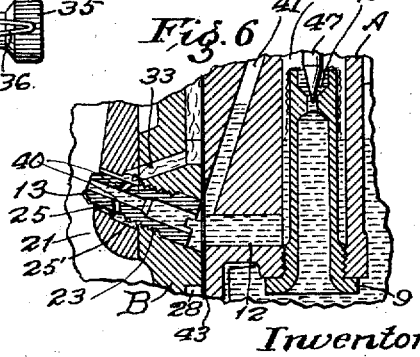
Fig. 6 is a fragmental section showing the sustained column of fuel in the fuel passage during idling.

In all the forms shown the nozzle 13 is provided with a bore enlarged at its entrance, that is to say at the end into which the fuel enters said nozzle from the suction chamber, as more particularly shown in Figs. 2 and 6.

In the form shown in Figs. 1*a* and 2 the horizontal passage 12′ of the fuel passage is of slightly smaller diameter than in the form shown in Fig. 1 and the end thereof adjacent the nozzle 13 is enlarged to form enlargement 50 in the bottom of the U-tube fuel passage. The purpose of this enlargement will be more fully hereinafter set forth.

An idling by-pass 26 opens through an idling fuel jet 27 to the suction passage beyond the throttle and is continued by the cored passage 28, which is curved at 29 to clear the nozzle 13, and is extended by an idling by-pass tube 30 to a sump 31 in the air intake. The lower end of tube 30 is provided with cross holes 32 to insure full opening of the tube 30 at its lower end.

The idling by-pass is connected to the enlargement 25′ of bore 25 by a drilled hole 33. The idling by-pass 26 is provided with a valved vent 34 that opens into the main air stream at a point slightly below the smallest portion of the Venturi throat and is controlled by a suitable needle valve 35, which is held in adjusted position by a spring retainer 36.

The idling by-pass is provided with an additional air bleed, which opens into the cored passage 19 of the balancing means through the calibrated plug or vent 37.

The vent 37, the clearance bore 25, the by-pass tube 30, constitute fixed vents to reduce the pressure in the idling by-pass 26 from that above the throttle. The vent 34 provides a suitable additional vent which is used to adjust the depression in the idling by-pass. This depression is applied to the suction chamber 11, and thus to the fuel orifice 10, by means of the calibrated idling depression passage 38 the flow through which may be varied by changing the calibrated plug 38′. From the foregoing it is apparent that it is possible to adjust the idle mixture by means of the valve 35.

Air is admitted from the float chamber to the suction chamber through the calibrated vent 39, and thereby provides means connecting the suction chamber to the air intake through the balancing air passage.

Small holes 40 are provided in the nozzle 13 and such holes connect the bore of the nozzle 13 to the enlarged clearance 25′, and thus by the hole 33 to the idling by-pass and thus to the idling fuel jet 27.

The horizontal passage 12 of the fuel passage is connected to the passage 38 by means of a supplemental passage 41, which is preferably restricted at its upper end. This passage provides additional accelerating fuel and admits air from the upper end of the suction chamber to the fuel passage near the nozzle 13, thus aiding in early delivery of accelerating fuel.

The member B is provided with a flanged face 42 in which a major portion of the idling by-pass 26 is formed by coring the member when the same is cast.

A common gasket 43 is interposed between the members B, A and C to provide an air and gasoline tight joint between such parts.

A packing 44 interposed between the top of member A and member C provides a tight joint between said members around the opening 45 through which extends the boss 46 of member A and in which boss is threaded the high speed adjusting needle 47 that adjusts the opening of the fuel orifice 10.

The member A is provided with a bore forming the suction chamber and such bore is threaded at the lower end to receive the threaded portion 48 of the riser 9, and thus provides simple means for assembling the fuel riser.

The air intake in this application is understood to include that portion of the main air stream from the beginning of the air intake to the lower end of the venturi, and the suction passage includes that portion of the main air stream from the lower end of the venturi to the carburetor flange *y* and such portion may include what has heretofore been designated in some types of carburetors as a mixing chamber, a mixture outlet and a suction passage.

An annular groove 49 formed in the wall of the air intake prevents condensed fuel from running down the walls of the air intake past the choke valve 16.

The end of tube 30 extends into the lower end of this groove 49, which lower end forms the sump 31, and the accumulated condensed fuel is delivered from the sump to beyond the throttle through the idling by-pass and any fuel falling down from the suction passage as the engine slowly stops is carried into the engine through the tube 30 and idling by-pass and thus prevents dripping of fuel from the carburetor after the engine has stopped.

The construction shown in Fig. 1 is satisfactory for all heavy duty motors with relatively large displacement and moderate speeds.

The construction of the fuel passage and supplemental passage 41′, shown in Figs. 1*a* and 2, is deemed preferable for such types of motors that develop a large amount of power from a relatively small displacement and at relatively high motor speeds.

Due to the small displacement of these high speed motors when idling they require very little fuel for idling and it has been found difficult to form a seal in the lower portion of the U-tube fuel passage, when such fuel passage is large enough to develop full power as with the device in Fig. 1; and in such high speed motors I prefer to use the construction shown in Fig. 1*a* and in which the supplemental passage 41′ is open to the passage 38 its full diameter as shown in Fig. 1*a*.

This passage 41′ being open full size to the passage 38, without the restriction at the top, as shown in Fig. 1, allows the passage of more air from the calibrated vent 39 through passage 41′ under load, which again makes possible the reduction in diameter of the horizontal portion 12′ of the fuel passage so that this portion 12′ is just sufficiently large enough for the flow of fuel and some small amount of air.

The lower end of the passage 41′ is extended to below the center of the portion 12′ of the fuel passage by a tube 51, thus making it possible to readily seal the fuel passage, when idling.

In operation of the device shown in Fig. 1, fuel is supplied to the constant level fuel chamber 4 in the usual way. When the carburetor is at rest this fuel is protected from overflow into the suction chamber by the proper height of the top of the fuel riser 9 above the constant fuel level 8.

When under load with the throttle valve at any degree of opening above idling the normal flow of fuel is through the bore of the riser 9, thence through the restricted fuel orifice 10 under control of the high speed adjusting needle 7 into the U-tube fuel passage comprising the suction chamber 11, into the lower end of which the riser 9 extends and forms an annulus between the riser and the walls of the suction chamber that forms one limb of the U-tube, thence into the horizontal passage 12 and upwardly inclined nozzle 13 from which the fuel is discharged into the main air stream at the Venturi throat slightly above the smallest diameter of the Venturi throat.

At the same time air will be drawn into the fuel passage through the calibrated vent 39 and flow with the fuel through the fuel passage, following two paths, one down through the annulus about the riser, and the other by way of the supplemental passage 41 which is contracted at the top, thus supplying air for atomization and rapid beginning of delivery of fuel through the fuel nozzle 13.

When idling the throttle is closed and the depression in the chamber 11 is increased over that applied in such chamber 11 through the nozzle 13. This increased depression is applied to the suction chamber through the idling fuel jet 27 and the idling by-pass 26 and the calibrated idling depression passage 38 that opens from the idling by-pass 26 into the suction chamber above the riser. This increased depression from above the throttle is modified by fixed bleeds and by the valved vent 34.

The idling by-pass tube 30 constitutes one of these fixed bleeds and such bleed 30 performs the additional function of conducting liquid fuel from the sump 31 to the idling by-pass. The definite clearance around the discharge end of the nozzle 13 connected to the idling by-pass through the drill hole 33 constitutes a second fixed bleed and the calibrated plug 37, a third fixed bleed.

The first thus reduces the depression in the idling by-pass 26 a definite amount below that from above the throttle and the valved vent 34 under control of the needle valve 35 is used to control or vary the reduction of the depression in the idling by-pass by supplementing the constant or fixed bleeds by a variable bleed.

If the throttle is closed to idling position after the engine has been running at any load or speed condition, the fuel moving through the fuel passage becomes temporarily at rest in the horizontal portion 12 of the fuel passage and seals off the connection betwen such horizontal portion and the annulus formed around the riser in the suction chamber. By thus sealing the passage 12 the depression applied in the suction chamber 11 through the idling by-pass will immediately rise in value in excess of the depression at the end of the nozzle 13 in the venturi and such excess in depression will sustain in the suction chamber and in the supplemental passage 41 against the force of gravity, a column of fuel the level of which is considerably higher than the discharge end of the nozzle 13 and the height of this sustained column of fuel is controlled by opening or closing the valved vent 34.

The fuel accumulated in the supplemental passage 41 is sustained at the same or a greater height than the fuel in the suction chamber and provides additional fuel for acceleration purposes.

Continued operation of the engine causes fuel to be lifted over the top of the riser from which it will be added to the sustained column of fuel in the suction passage and this addition of fuel will cause an equal amount of fuel to be displaced from the end of the nozzle 13 or through the small holes 40 provided in the nozzle 13. The fuel discharged from the end of the nozzle 13 during idling will flow in a small film around the edge of the nozzle 13 and thence into the enlargement 25′ at the inner end of the bore 25 from which it will be drawn into the idling by-pass through the drill hole 33 and thence to beyond the throttle where it is delivered to the suction passage through the idling fuel jet 27. If for any reason the fuel emitted from the discharge end of the nozzle 13 during idling should flow down the side walls of the air intake, it will be stopped from flowing out of the air intake by the annular grove 49 from which it will be delivered to the idling by-pass through tube 30.

Upon opening the throttle fuel immediately begins to discharge more rapidly from the nozzle 13 because the depression sustaining the column of fuel in the suction chamber and the supplemental passage has been removed, and such discharge of fuel is followed by air from the air intake through the vent 39 and then, first through the supplemental passage 41 and second through the annulus in the suction chamber. The flow of air through the supplemental passage 41 begins atomizing the fuel at an early period in the discharge from the nozzle and as the engine gains speed the flow of air through the passage 41 and the annulus will gradually clean out all of the sustained fuel until the engine reaches a speed that will require all of the passage 12 for the newly proportioned fuel and air under any particular continuous load operation so that under any considerable load no fuel will remain in the fuel passage other than that continuously supplied for operation of the engine.

The openings 40 upon closing the throttle to idling position facilitate immediately enriching the idling mixture by drawing directly upon the fuel through the idling by-pass until the fuel reaches the openings 40.

The size of the openings 40 may be such that when idling substantially all of the fuel required to supply the engine will flow through such openings, but some of the fuel may flow past the openings 40 and discharge from the end of the fuel nozzle 13 and be delivered to the engine as above set forth.

The air supplied to the constant level fuel chamber 4 and to the suction chamber and fuel passage provides a balancing means to maintain a pressure in the fuel chamber coordinating with that in the air intake and is similar in many respects to the balancing system set forth in my Patent No. 1,506,229, patented August 26, 1924.

The function of the various fixed bleeds for the idling by-pass is believed to be apparent to anyone versed in the art and therefore only a brief explanation of the same will be given. The calibrated vent 39 has to do with the effectiveness of atomization and rapid delivery of the fuel sustained during idling for acceleration purposes. Enlarging the vent 39 increases the fuel economy and reduces the amount of fuel sustained for acceleration purposes.

The idling depression passage 38 has to do with developing the correct idling mixture. The bleed 37 has to do with refining the development of the idling depression changing the size of the passage 38. One drill size may make too great a change in the idling mixture and leave the idling mixture beyond the control of the valved vent 34. Then, in order to bring the idling mixture under the control of the valved vent the calibrated plug or vent 37 can be changed to a larger or smaller size, as the case may be. This function is the main reason for the vent 37.

However, the vent 37 combined with the passage 38 performs another function. Enlarging the vent 37, all other things being constant, increases the depression applied on the surface of the fuel in the fuel supply chamber 4 during idling. Such depression is operatively effective on the fuel supply to the orifice 10 to bring about the same condition as though the fuel level in the chamber 4 had been lowered and when such depression occurs the depression applied in the suction chamber 11 must be increased to draw the fuel over the top of the riser 9, and when the depression in chamber 11 is increased the height of the sustained column of fuel is greater whenever the vent 37 is enlarged.

When a good metering curve and good idling mixture is obtained, but the pick-up from idling is not quite satisfactory, enlarging the passage 38 and then enlarging the vent 37 to again bring the idling mixture within the control of the valved vent 34 will increase the height of the column of fuel sustained in the fuel and supplemental passages and thus provide the desired fuel for acceleration from idling speed without requiring any change in the dimensions of the parts containing such accelerating fuel.

The height of the fuel sustained in the auxiliary passage 41 is determined by the velocity head through the vent 39 and the passage 38. The higher the velocity the higher the column of fuel.

The operation of the device shown in Figs. 1*a* and 2 is practically the same as above set forth with respect to the operation of the device shown in Fig. 1 except that upon closing the throttle after load to idling position, fuel will immediately accumulate in the enlargement 50 of the fuel passage and will be drawn with air through the supplemental passage 41′ and the calibrated plug 38′ and thereby supplies the motor with the necessary fuel until sufficient fuel has accumulated in the annulus around the riser and the horizontal portion 12′ of the fuel passage to seal off the lower end of this tube 51. When such seal takes place the fuel will rise in the passage 41′ and be sustained therein against the force of gravity and form an accumulation of fuel which serves as accelerating fuel. When the fuel seals the portion 12′ and the passage 41′, immediately thereafter the full idle mixture is obtained and the fuel will flow through the nozzle 13 and be delivered in the normal way to the main air stream.

Upon suddenly opening the throttle due to the fact that the lower end of the tube 51 is nearest the nozzle, this portion of the accelerating fuel is discharged quickest and is followed immediately by air from the vent 39 through idling depression passage 38 and thus produces early atomization of fuel in the accelerating period.

The remainder of the fuel accumulated in the fuel passage is slowly delivered to the main air stream and continues to supply accelerating fuel for a smooth aggressive acceleration which is highly desired on motors which obtain their maximum horse power at high motor speed with rather small displacement.

I claim:

1. A carburetor comprising an air intake; a throttle controlled suction passage; a constant level fuel chamber; a fuel passage comprising a suction chamber, a fuel riser opening from said fuel chamber into said suction chamber above the normal fuel level; and a U-tube portion connecting said suction chamber to said suction passage; an idling by-pass leading from near the delivery end of the fuel passage to the suction passage above the throttle; and calibrated means supplying air to said suction chamber.

2. A carburetor comprising an air intake; a throttle controlled suction passage; a constant level fuel chamber; an idling by-pass leading from near the delivery end of the fuel passage to the suction passage above the throttle; a fuel passage comprising a suction chamber; a fuel riser opening from said fuel chamber into said suction chamber above the normal fuel level, and a U-tube portion connecting said suction chamber to said suction passage; a passage connecting said suction chamber and said idling by-pass; calibrated means supplying air from said air intake to said suction chamber; and a valve controlled passage open from the suction passage slightly below the Venturi throat to said idling by-pass to control the depression in the suction chamber when idling.

3. A carburetor comprising an air intake; a throttle controlled suction passage; a constant level fuel chamber; an idling by-pass; a fuel passage comprising a suction chamber, a fuel riser opening from said fuel chamber into said suction chamber above the normal fuel level, and a U-tube portion connecting said suction chamber to said suction passage; a passage connecting said suction chamber above the normal fuel level to said idling by-pass; means connected to said air intake for supplying air to said fuel chamber; and means connecting said idling by-pass with said fuel chamber above the normal fuel level therein.

4. In a carburetor, an air intake, a throttle controlled suction passage, a fuel passage connected to deliver fuel from a fuel supply to said suction passage and comprising a suction chamber, a fuel riser extending into said suction chamber above the normal fuel level and adapted to deliver fuel by overflow into said suction chamber above the normal fuel level, said suction chamber being connected below the constant fuel level to the suction passage by a suitable nozzle; an idling by-pass connected near the delivery end of said fuel passage and connected to apply in said suction chamber a depression from beyond the throttle to furnish fuel during idling; and means connecting said air intake with the fuel supply chamber and with said suction chamber.

5. A carburetor comprising a Venturi throat; an air intake, and a throttle controlled suction passage; a suction chamber; means adapted to deliver fuel to said suction chamber; a fuel passage adapted to deliver fuel from said suction chamber to said suction passage; a constant level fuel chamber supplied with air from the air intake and connected to said means to supply fuel to said suction chamber; an idling by-pass connected to the suction passage above the throttle and also connected to the suction chamber through a calibrated passage; said idling by-pass being open through a calibrated plug to the passage connecting the air intake and the fuel supply chamber; an adjustable vent connecting the idling by-pass and the suction passage at a point below the smallest diameter of the Venturi throat; said fuel passage being adapted and arranged to accumulate fuel against the force of gravity under the adjusted depression in the idling by-pass for purpose of supplying the idling mixture and for acceleration.

6. A carburetor having a Venturi throat and comprising an air intake; a throttle controlled suction passage; a constant level fuel chamber; a fuel passage in the form of a U-tube adapted to deliver fuel from said fuel chamber to said suction passage; there being an enlargement in the lower portion of the U-tube passage; an idling by-pass open from beyond the throttle; a passage connecting said idling by-pass intermediate its ends to said suction chamber above the normal fuel level in said fuel chamber; and a supplemental passage connecting the fuel passage below the center of said enlargement to the passage that connects the idling by-pass to the fuel chamber.

7. In a carburetor, an air intake; a throttle controlled suction passage; a fuel passage connected to deliver fuel from a fuel supply to said suction passage and comprising a suction chamber, a fuel riser extending to said suction chamber above the normal fuel level and adapted to deliver fuel into said suction chamber above the normal fuel level, said suction chamber being connected below the constant fuel level to the suction passage by a suitable nozzle; an idling by-pass connected near the delivery end of said fuel passage to apply in said suction chamber, a depression from beyond the throttle to furnish fuel during idling.

8. A carburetor comprising an air intake; a throttle controlled suction passage; a constant level fuel chamber; a fuel passage comprising a suction chamber, a fuel riser opening from said fuel chamber to said suction chamber above the normal fuel level; and a passage connecting said suction chamber to said suction passage; an idling by-pass leading from near the delivery end of the fuel passage to the suction passage above the throttle; and calibrated means supplying air to said suction chamber.

9. A carburetor comprising an air intake; a throttle controlled suction passage; a constant level fuel chamber; a fuel passage comprising a suction chamber; an idling by-pass leading from near the delivery end of the fuel passage to the suction passage above the throttle; a fuel riser opening from said fuel chamber to said suction chamber above the normal fuel level, and a passage connecting said suction chamber to said suction passage; a passage connecting said suction chamber and said idling by-pass; calibrated means supplying air from said air intake to said suction chamber; and a valve controlled passage open from the suction passage to said idling by-pass to control the depression in the suction chamber when idling.

10. In a carburetor, an air intake, a throttle controlled suction passage, a fuel passage connected to deliver fuel from a fuel supply to said suction passage and comprising a suction chamber, a fuel riser extending into said suction chamber above the normal fuel level and adapted to deliver fuel by overflow into said suction chamber above the normal fuel level, said suction chamber being connected below the constant fuel level to the suction passage by a suitable nozzle; an idling by-pass connected near the delivery end of said fuel passage and connected to apply in said suction chamber a depression from beyond the throttle to furnish fuel during idling; and means connecting said fuel supply chamber and said suction chamber with the atmosphere.

In testimony whereof, I have hereunto set my hand at Los Angeles, California, this 3rd day of November, 1932.

ORVILLE H. ENSIGN.